E. F. SIPHER.
RECTIFYING SYSTEM.
APPLICATION FILED MAY 25, 1914.
1,235,607.
Patented Aug. 7, 1917.
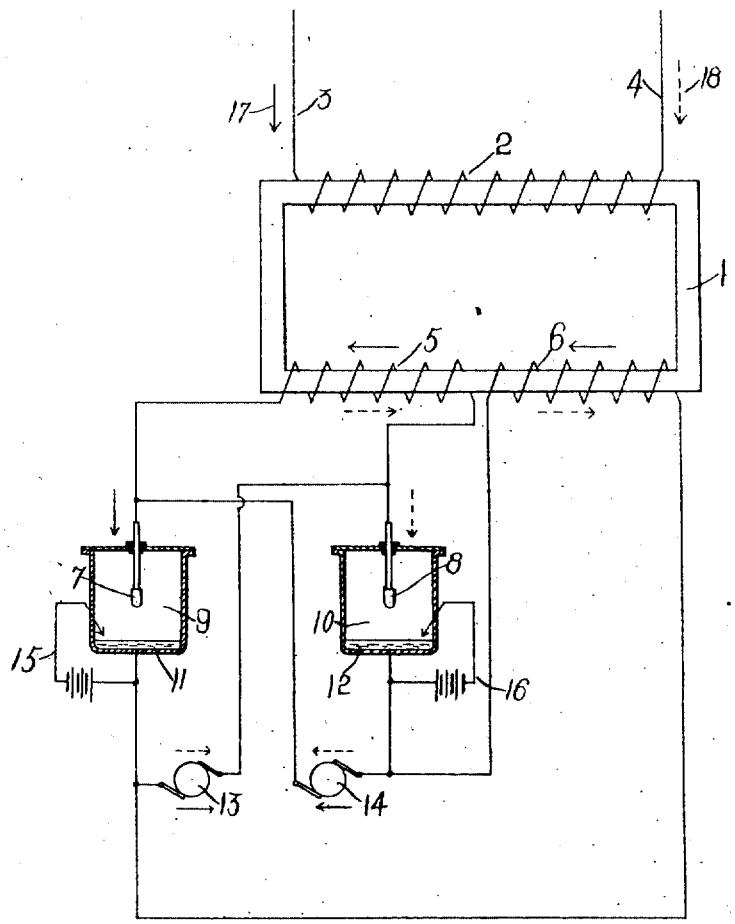
WITNESSES:
Clarence E. Myers
David C. Davis
INVENTOR
Edmund F. Sipher
BY
Wiley G. Carr
ATTORNEY

UNITED STATES PATENT OFFICE.

EDMUND F. SIPHER, OF WILKINSBURG, PENNSYLVANIA, ASSIGNOR TO WESTINGHOUSE ELECTRIC AND MANUFACTURING COMPANY, A CORPORATION OF PENNSYLVANIA.

RECTIFYING SYSTEM.

1,235,607.     Specification of Letters Patent.     Patented Aug. 7, 1917.

Application filed May 25, 1914. Serial No. 840,728.

*To all whom it may concern:*

Be it known that I, EDMUND F. SIPHER, a citizen of the United States, and a resident of Wilkinsburg, in the county of Allegheny and State of Pennsylvania, have invented a new and useful Improvement in Rectifying Systems, of which the following is a specification.

My invention relates to a rectifying system, and it has for its object to provide connections whereby transforming means, employed to derive current from a source, will be operated at a higher efficiency than has been possible with the systems of connections hitherto employed.

The single figure of the accompanying drawing is a diagrammatic view of a system embodying my invention.

The usual method employed hitherto for the rectification of alternating current by means of asymmetric conductors has been to connect the anodes of the conductors to the terminals of an alternating-current source and to connect the cathodes of the conductors through a load to a point of intermediate potential of the source, such, for example, as the mid point of the secondary winding of a transformer. In a great many localities, it is essential that current from an alternating-current system to a rectifier be supplied by means of a transformer, not only in order that proper voltage regulation may be had, but also that the local rectifying circuit be insulated from the main supply circuit. With the use of such transformers and the above described method of connections, each half of the transformer secondary winding is active only on alternate half cycles. This periodic inactivity of the different portions of the secondary winding necessitates the employment of more iron and of more copper than would otherwise be necessary, necessitating not only greater weight and bulk in the transformer, but also greater iron and copper losses. By my invention, I obviate these disadvantages and employ a transformer wherein all portions of the secondary winding are active during each half cycle.

Referring to the accompanying drawing, 1 is a transformer having the terminals of its primary winding 2 connected to the mains 3 and 4 of a suitable supply circuit. The transformer 1 is provided with two secondary windings 5 and 6. The two terminals of the winding 5 are connected, respectively, to the anodes 7 and 8 of two asymmetric conductors 9 and 10, preferably of the mercury arc type. The terminals of the winding 6 are connected, respectively, to the cathodes 11 and 12 of the rectifiers 9 and 10. Any suitable load, such, for example, as a motor 13, is connected between the cathode 11 and the anode 8, and a similar load 14 is connected between the anode 7 and the cathode 12. The rectifiers 9 and 10 are started and their continuous operation assured by any suitable means, such, for example, as keep-alive circuits 15 and 16.

Having thus described the arrangement of the different elements of my system, the operation is as follows: Assuming a positive wave to flow from the main 3 as indicated by an arrow 17, secondary currents will be induced in the windings 5 and 6, as indicated by the full-line arrows adjacent thereto. The induced current wave from the winding 5 will traverse the rectifier 9 and the load 13, and return to the other terminal of the winding. At the same time, the induced current wave from the winding 6 will traverse the motor 14 and the rectifier 9, and return to the other terminal of the winding 6, all as indicated by full-line arrows in the various parts of the system. A half cycle later, a positive wave flowing from the main 4, indicated by a dotted-line arrow 18, will induce current waves in the two windings 5 and 6, as indicated by the dotted-line arrows adjacent thereto. The wave from the winding 5 will traverse the rectifier 8 and the motor 14, while the wave from the winding 6 will traverse the motor 13 and the rectifier 8. It is thus seen that the direction of current flow through the motors 13 and 14 is, at all times, the same.

There are many instances where the load of a rectifying system is necessarily divided into two or more small units as, for example, on the vehicle of an electric railway. With systems of this character, the fact that I am obliged to supply the rectified current to two separate motors rather than to one large motor is absolutely no disadvantage.

In the subjoined claims, I shall employ the term nominal in referring to the polarity of the respective electrodes, thereby designating the polarity of the electrodes when actively employed in carrying load current.

Obviously, with a four motor vehicle, half the motors may be connected as is the motor 13 and half the motors may be connected as is the motor 14. Generally speaking, my system of rectification may be applied in any place where the old systems have been employed, the only limitation being that the load must be divided into two substantially equal parts.

I claim as my invention:

1. The combination with two sources of alternating current substantially in phase with each other, of two asymmetric conductors, connections from the two terminals of one source to the two anodes of the asymmetric conductors, respectively, connections from the two terminals of the other source to the two cathodes of the asymmetric conductors, respectively, a load circuit connecting the anode of one asymmetric conductor and the cathode of the other asymmetric conductor, and a load circuit connecting the cathode of the first mentioned asymmetric conductor and the anode of the last mentioned asymmetric conductor.

2. The combination with a transformer provided with two secondary windings, of two asymmetric conducting units, connections from the two terminals of one secondary winding to two terminals of said units of like nominal polarity, respectively, connections from the two terminals of the other secondary winding to the two terminals of said units of the other nominal polarity, respectively, a load circuit connecting a terminal of one nominal polarity of one asymmetric unit to the terminal of the other nominal polarty of the other unit, and an additional load circuit connecting the remaining terminals of said units.

In testimony whereof, I have hereunto subscribed my name this 19th day of May, 1914.

EDMUND F. SIPHER.

Witnesses:
D. E. CARPENTER.
B. B. HINES.